(No Model.) 5 Sheets—Sheet 1.
S. G. RANDALL.
SEED PLANTER.
No. 485,226. Patented Nov. 1, 1892.
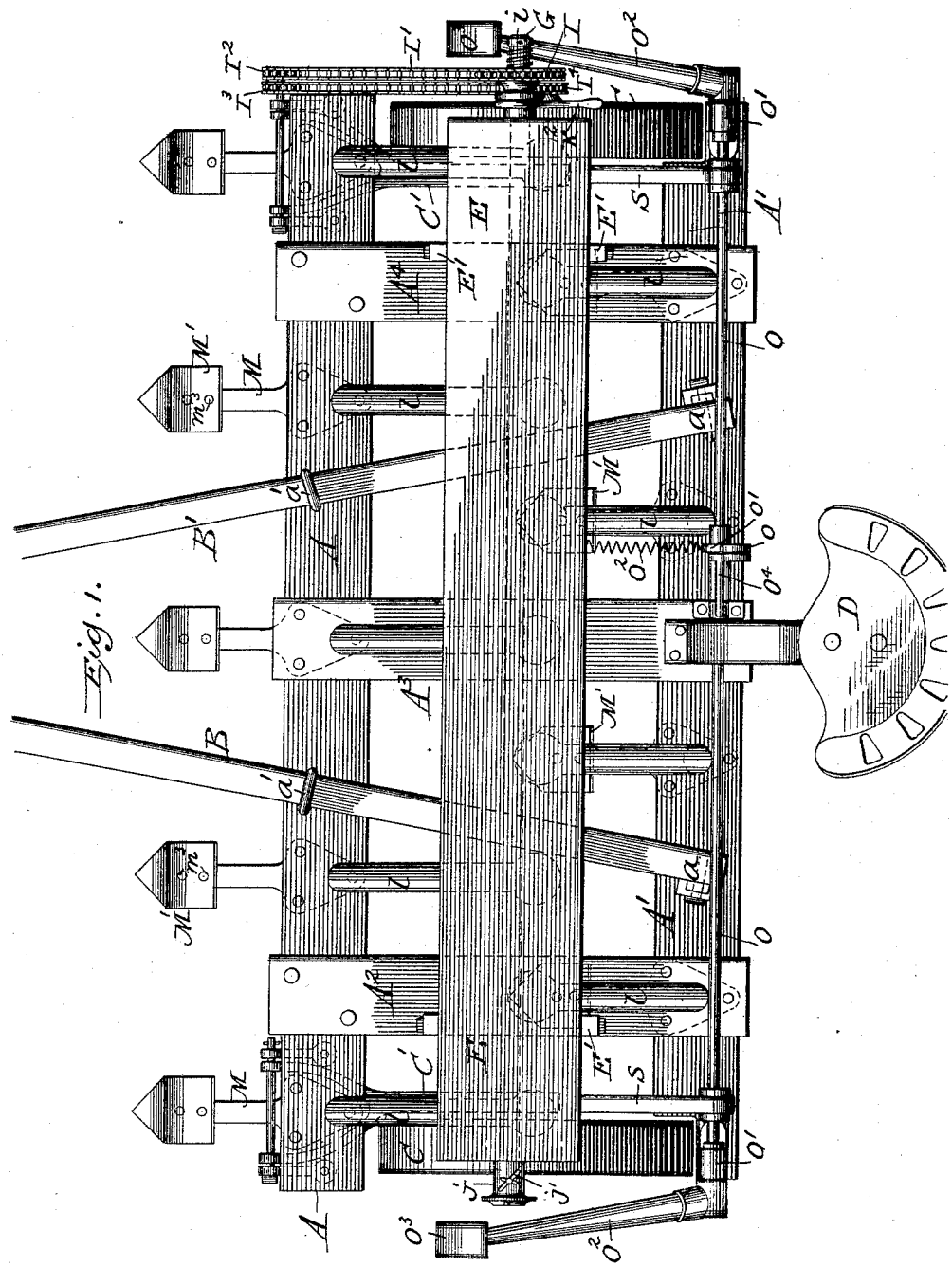

(No Model.)　　　　　　　　　　　　　　　　　5 Sheets—Sheet 2.
S. G. RANDALL.
SEED PLANTER.
No. 485,226.　　　　　　　　　　Patented Nov. 1, 1892.
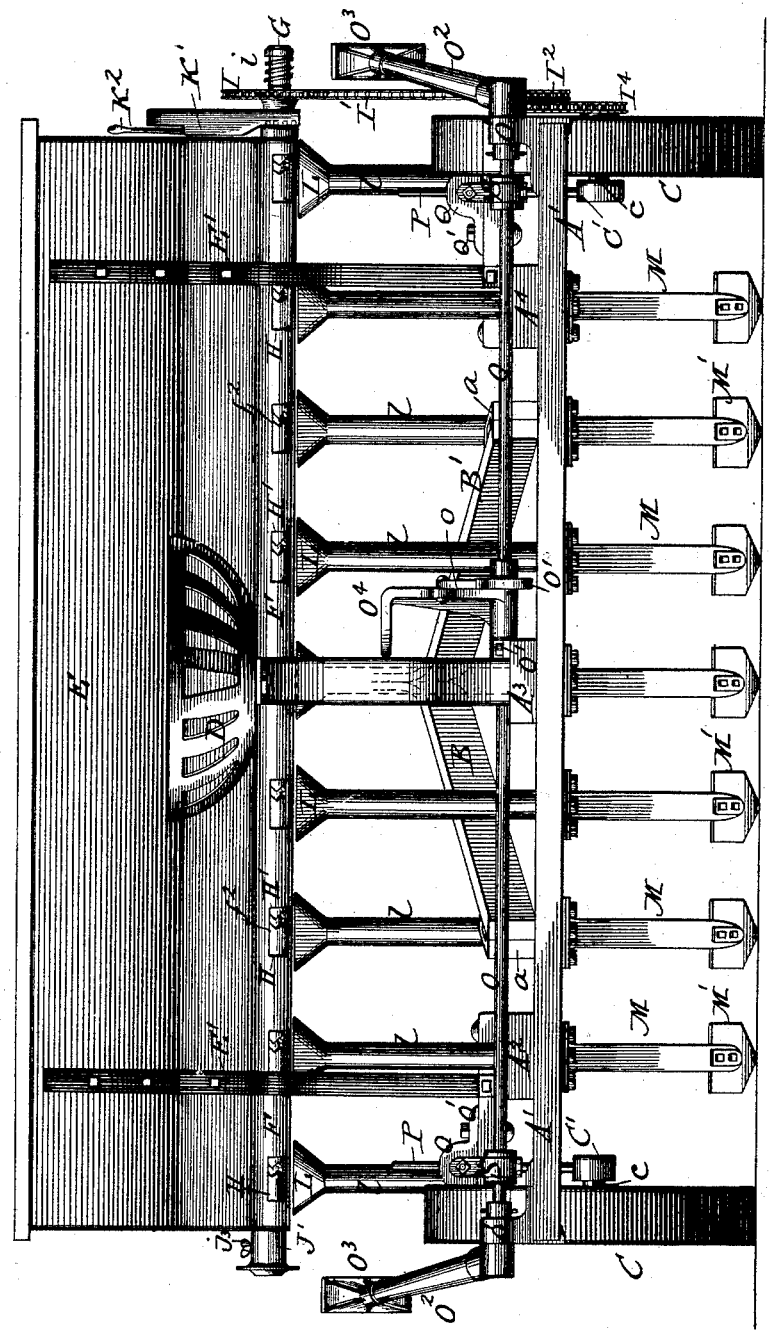
Witnesses:
Arthur Ashley
Joseph C. Stack,
Inventor
Silas G. Randall
by his attorneys
Baldwin Davidson Wight.

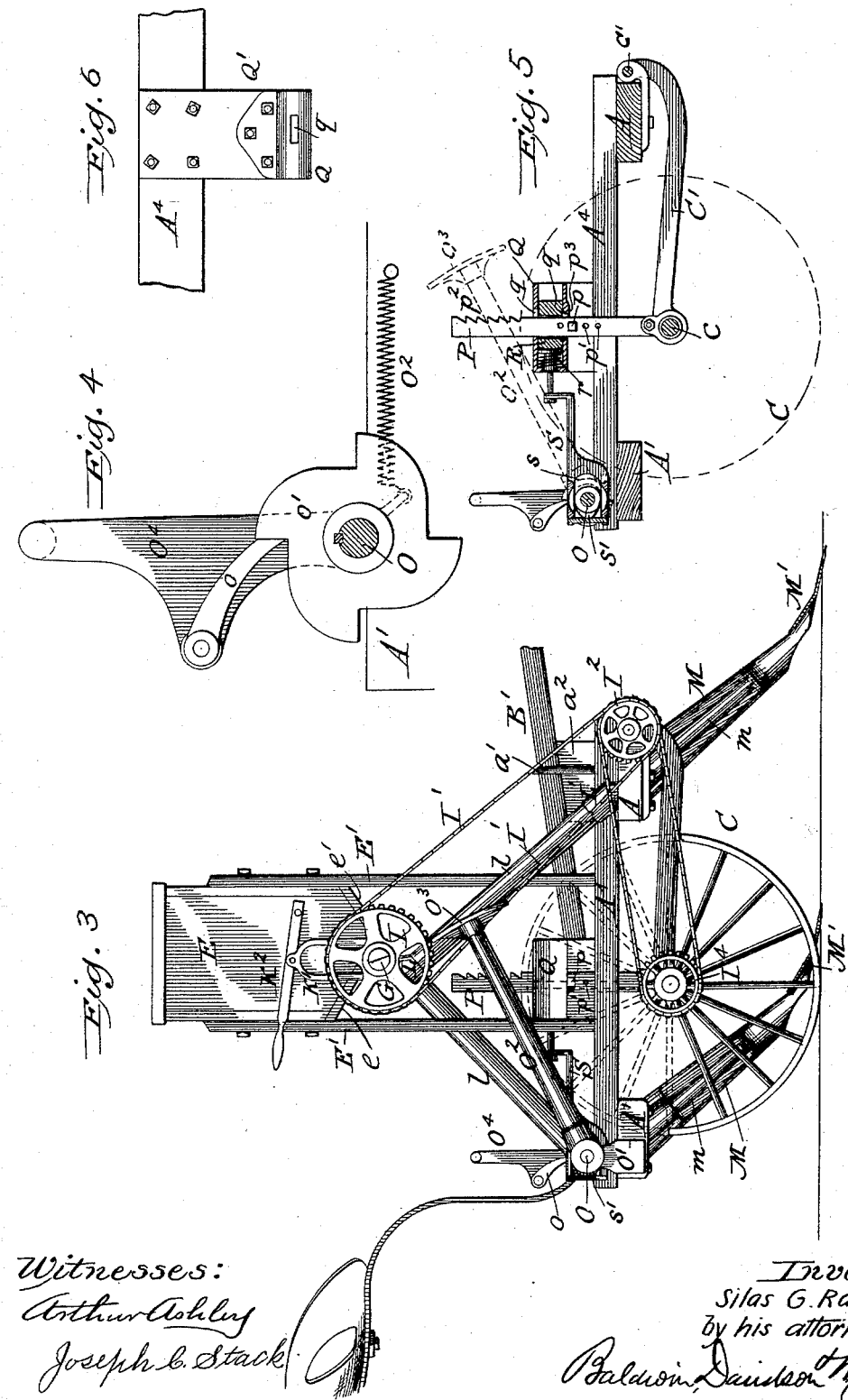

(No Model.)  5 Sheets—Sheet 4.
S. G. RANDALL.
SEED PLANTER.
No. 485,226.  Patented Nov. 1, 1892.
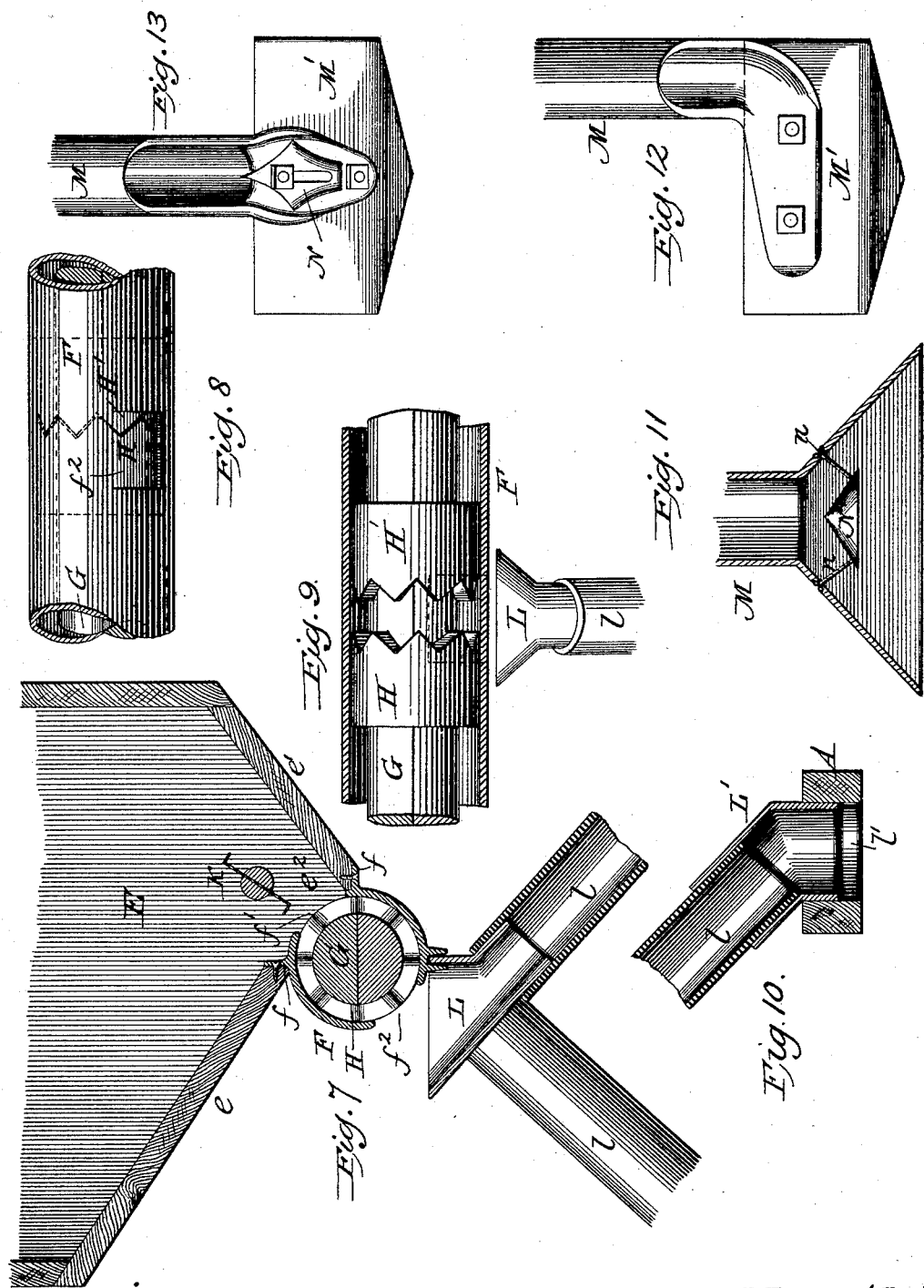
Witnesses:
Arthur Ashley
Joseph C. Stack.
Inventor:
Silas G. Randall
by his attorneys
Baldwin, Davidson & Wight

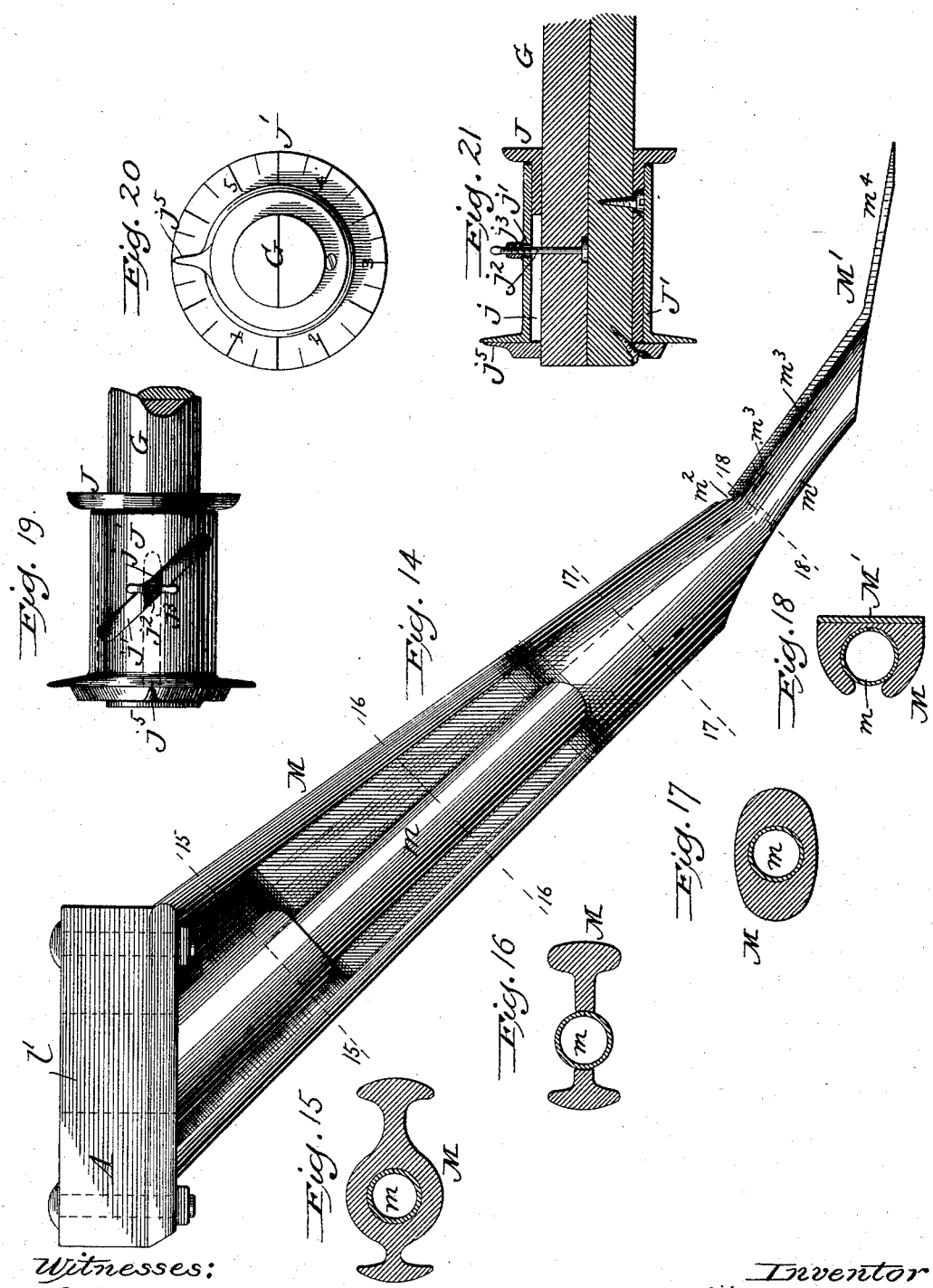

UNITED STATES PATENT OFFICE.

SILAS G. RANDALL, OF GREENE, NEW YORK, ASSIGNOR TO AMELIA A. RANDALL, OF SAME PLACE.

SEED-PLANTER.

SPECIFICATION forming part of Letters Patent No. 485,226, dated November 1, 1892.

Application filed March 5, 1892. Serial No. 423,905. (No model.)

*To all whom it may concern:*

Be it known that I, SILAS G. RANDALL, a citizen of the United States, residing at Greene, in the county of Chenango and State of New York, have invented certain new and useful Improvements in Seed-Planters, of which the following is a specification.

The primary object of my invention is to provide efficient means for sowing seed, with efficient harrowing or cultivating devices. Usually the operations of harrowing and seed-planting are separate and distinct, and, so far as I am aware, no practical machine has been produced previous to my invention in which the two kinds of work were done simultaneously.

In carrying out my invention I adopt seed-feeding devices of the most approved class—viz., the "force feed"—and so construct, arrange, and operate said devices as to provide for their efficient, uniform, and easy operation. I connect the seed-feeding devices with teeth of an improved form and construction, adapted to lift the soil, allow the seed to be scattered and deposited beneath the uplifted earth, and to then drop the soil in a loose pulverized condition upon the seed thus planted.

My improved machine also embodies in its construction novel devices for lifting the teeth from the ground when it is desired to turn or when not in operation, and certain improved organizations of instrumentalities and novel details of construction, which will be hereinafter described and claimed.

In the accompanying drawings, showing a machine embodying my invention, Figure 1 is a plan view; Fig. 2, a rear elevation; Fig. 3, a side elevation; Fig. 4, a detailed view, on an enlarged scale, of part of the mechanism for raising the teeth; Figs. 5 and 6, detail views of other parts of the same mechanism. The remaining views are on an enlarged scale. Fig. 7 is a detail view, in section, of the seed-feeding devices. Figs. 8 and 9 are further details of said devices. Fig. 10 is a detail view of one of the joints in a seed-passage. Figs. 11, 12, and 13 are views of teeth which may be employed. Fig. 14 is a side elevation of the preferred form of tooth. Figs. 15, 16, 17, and 18 are cross-sections on the lines 15 15, 16 16, 17 17, and 18 18, respectively, of Fig. 14. Figs. 19, 20, and 21 are detail views of the devices for adjusting the feed and for indicating the amount of grain sown.

The main frame may be of any suitable construction. As shown, it consists of front and rear beams A A', transverse to the line of draft, and cross connecting-beams $A^2 A^3 A^4$, parallel with the draft-line. A tongue consisting of two members B B' is secured rigidly to the frame. Each tongue member is pivotally connected to the rear beam A' at $a$, and staples $a'$ connect it to the front beam. Adjustable wedges $a^2$, Fig. 3, are employed for varying the inclination of the tongue to the desired extent.

The carrying-wheels C have short independent axles $c$, carried by arms C', pivotally connected to the front beam at $c'$ and extending rearwardly therefrom. The wheel-carrrying-arms C' are supported and adjusted at their rear ends in a manner hereinafter described.

The driver's seat D is mounted on the frame behind a seed-box E, which is supported on standards E', by which it is held a suitable distance above the main frame to allow the seed to be carried through the seed-passages by gravity to the teeth. The seed-box is provided with a hopper-shaped bottom, the rear inclined side $e$ of which is slightly longer and is arranged a little above the front side $e'$. A longitudinal opening $e^2$ is formed between the sides $e$ and $e'$, and into this opening projects the upper front portion of a longitudinal feed-tube F, which, as shown, is provided with lugs or flanges $f$, by which it is secured in place.

The tube F is formed with a series of pairs of openings $f'$ $f^2$, through which the seed is fed to conduits leading to the teeth. The openings of each pair are in line with each other; but the lower opening $f^2$ is in rear of the axis of the tube, while the upper one $f'$ is in front of it. Within the tube is arranged a longitudinally-divided feed-shaft G, preferably circular in cross-section from end to end, as shown, and of a somewhat-smaller diameter than the interior diameter of the tube. This shaft carries a series of pairs of feed-collars H H', which are of the same size and form; but one collar of each pair is secured to a longitudinally-adjustable member of the shaft, while the other collar is secured to a non-adjustable member thereof. The collars are arranged to fit snugly in the tube, but they are free to revolve therein. There is a pair of collars at each pair of openings $f'$ $f^2$ in the tube. The opposing sides of the collars of each pair are serrated and the arrangement is such that the collars may be brought together with their teeth interlocking to completely close the openings in the tube. The stationary or non-adjustable collar of each pair is arranged at one side of its pair of openings, while the adjustable collar may be moved back and forth across the opening to vary the passage for the seed-exit. The opposite ends of the shaft outside the tube F are provided with caps or collars. At one end the cap is provided with a serrated hub, which by means of a spring $i$ is normally held in engagement with a sprocket-wheel I, connected by a chain I' with a sprocket-wheel $I^2$ at the front of the main frame. The axle of the wheel $I^2$ is in line with the axis of the wheel-carrying arms C', and this shaft carries a sprocket-wheel $I^3$, which connects with a sprocket-wheel $I^4$ on one of the carrying-wheels. By this means a rotary motion is given to the divided feed-shaft and to the seed-feeding devices carried thereby. The opposite end of the shaft G is provided with means for adjusting one member relatively to the other. The preferred means for this purpose is shown in Figs. 19, 20, and 21. As there shown, a flanged sleeve J closely surrounds both members of the shaft and is secured to the non-adjustable member thereof. A flanged sleeve J' surrounds the sleeve J and is free to turn thereon. The sleeve J is formed with a longitudinal slot $j$ and the sleeve J' with an inclined slot $j'$. A pin or bolt $j^2$, extending through both slots, is secured to the adjustable member of the shaft and is provided with a clamping-nut $j^2$ at its outer end. Now if the sleeve J' be turned on the sleeve J a longitudinal movement will be given to the adjustable member of the shaft in an obvious manner, and by this means the distance between the two feed-collars of each pair may be varied. An index-finger $j^5$, secured to the non-adjustable member of the shaft, points to a dial on the flange of the sleeve J', by which means the quantity of grain sown may be readily determined.

The delivery of seed from the seed-box may be assisted by an agitator K, if desired. The feed-shaft may be brought into and out of gear with the carrying-wheels by means of a forked wedge-block K', operated by a lever $K^2$. The wedge-block is adapted to move the sprocket-wheel I against the force of the spring $i$ out of engagement with the serrated hub on the shaft. The seed passes from the feed-tube to two rows of teeth at front and rear, the rear row being preferably arranged in draft-lines intermediate those of the front row. I have shown in the drawings five teeth in the front row and four in the rear row, the two end teeth of the front row being arranged in front of the carrying-wheels. Below the openings in the feed-tube are arranged a series of funnel-shaped mouthpieces L, to which are connected tubes $l$, (preferably rubber,) which are connected at their lower ends to elbow-castings L', Fig. 10, secured to the transverse beams A A' of the frame. The mouthpieces, tubes, and elbow-castings are of course suitably arranged to convey the seed in opposite directions to both the front and rear rows of teeth. I designate as teeth those parts of the machine below the main frame to which the feed tubes or conduits $l$ are connected. The preferred form of tooth is shown in Fig. 14. It inclines forwardly from the frame and connects with an opening $l'$ in the transverse beam A or A', to which the corresponding elbow-casting L' and its tube $l$ are connected. The shank of the tooth is of a construction clearly shown by the cross-sections, Figs. 15, 16, 17, and 18, by which the desired strength is afforded, and yet there is no undue bulk or weight of metal. The casting M of the shank carries within it a sheet-iron tube $m$, which is inclosed at top and bottom by the casting, but is exposed intermediate its ends, as shown in Fig. 16. This sheet-iron tube need not be secured at its edges, but may be held in proper shape by its own resiliency and may be adjusted within the casting. At its lower end the casting is open at $m'$ on its under side, and it is preferably bent at $m^2$, so that its extreme lower end will not incline to so great an extent as the other portion of the shank—that is to say, it is flat or nearer to a horizontal. To the lower end of the shank is adjustably secured, by means of set-screws $m^3$, the shovel, blade, or tooth proper M'. As shown in Fig. 14, the shovel is applied to the top of the lower end of the shank, and at the lower end of the shank it is bent upwardly, so as to present a front inclined end $m^4$, adapted to work under the soil, lift it, and let it drop on the seed after they are planted. The shovel is quite wide, and the shank of the tooth is relatively small, so as not to afford an obstruction or tend to force the earth sidewise to any great extent. By this construction the soil is harrowed in the act of planting seed, and after the machine has passed on the soil is left in a well-cultivated condition with the seed planted. The tooth is constructed at its lower end to spread the seed just before it is delivered below the uplifted soil. In Fig. 13 an adjustable wedge-shaped piece N is shown for this purpose. In Fig. 12 the shank of the tooth is arranged at one side of the shovel and is so constructed as to give to the seed a sidewise motion, so that they will be distributed across the under face of the shovel while under the soil.

In Fig. 11 I have shown the tooth of a different form. It is of substantially the same form and construction as that shown in my patent, No. 465,497 of December 22, 1891— that is to say, the tooth is cone, bell-shaped, or pyramidal. It is adapted to lift, loosen, and pulverize the soil without turning it over, and while the soil is lifted the seed may be planted. The tooth and its shank are hollow, as clearly shown, and below the hollow shank is a conical distributer N', held in place by screws or bolts $n$.

I will now describe the mechanism for raising and lowering the teeth. At the rear end of the frame, just below the driver's seat-standard, is arranged a transverse shaft O, mounted in suitable bearings O' at each end of the rear transverse beam A'. On each end of the shaft, which projects from the bearings O', is secured a radial outwardly-inclined lifting-arm $O^2$, each carrying at its outer end a foot-piece $O^3$. The arms are of sufficient length to lift the frame, so as to raise the teeth from the ground when the arms are in a vertical position. Intermediate the ends of the shaft O, and within convenient reach of the driver, is pivoted a foot-lever $O^4$, carrying a pawl $o$, engaging a ratchet $o'$, keyed to the shaft O. The shaft is held in its normal position by means of a spring $o^2$, and by means of the pawl $o$, engaging the ratchet $o'$, the shaft may be turned against the force of the spring $o^2$ to move the lifting-arm to the desired extent. To the axles $c$ of the carrying-wheels C are connected vertical rack-bars P, extending upwardly through slots $q$ in cylindrical casings Q, formed in brackets Q', (see Fig. 6,) mounted on the main frame. The rack-bars may move up and down through the slots $q$. The extent of upward movement may be regulated by means of pins or screws $p$, adjustable in holes $p'$. The teeth $p^2$ of the rack-bar P are adapted to engage with teeth $p^3$ in the casings Q. The rack-bars also extend through slotted cylindrical blocks R, adapted to slide back and forth in the cylindrical casings Q. The blocks are normally pressed forward by springs $r$ and they are connected to arms S, slotted at $s$ to receive the shaft O. The shaft O carries cams $s'$, adapted to work in the slots $s$. In Fig. 5 the cams are arranged to hold the blocks R back against the force of the springs $r$, so that the teeth of the rack-bar do not tend to engage with the teeth $p^3$ of the casings Q; but when the shaft is turned so that the cams do not press against the rear walls of the slots, then the springs $r$ tend to force the teeth of the rack-bars into engagement with the teeth $p^3$ of the casings when in proper position to do so.

As shown in Fig. 3, the teeth are in proper working position. When it is desired to turn the machine, the driver moves forward the ratchet $o'$ by means of the foot-lever $O^4$ and gives the shaft O a quarter-turn. By this means the feet of the lifting-arms are moved into contact with the ground; but they radiate in a forwardly-inclined direction. The forward movement of the machine causes the arms to straighten out to a vertical position and the rack-bars P descend through the casings Q, and their teeth engage with the teeth $p^3$ of the casings. The effect of this is to raise the main frame, and thus elevate the teeth above the ground. It will be understood that when the shaft O is first moved the cams $s'$ are turned to permit the springs $r$ to press the cylindrical blocks forward, so that the rack-bars may be held in engagement with the casing. It will also be understood that the driver gives to the shaft O only a quarter-turn, the second quarter-turn being given to the shaft automatically by the forward movement of the machine. When the machine is thus elevated, it may be moved and turned, with the feet $O^3$ resting and sliding on the ground. When the machine is being drawn to and from the field, the teeth should be lifted, and at the same time the lifting-arms should be raised from the ground. The driver may do this by giving another turn, or a turn in addition to those above described, to the shaft by means of the foot-lever. When the shaft O is given the fourth quarter-turn, the lifting-arms will be brought into the position shown in Fig. 3 and the cams $s'$ will be brought into the position shown in Fig. 5, the rack-bars P having been thereby disengaged from the teeth $p^3$, and the frame with the teeth will have been lowered to working position. (Shown in Fig. 3.)

It will thus be seen that I have provided a machine simple in construction and operation, but adapted to do the work of seed-planting and harrowing simultaneously in the most efficient manner.

I have described and illustrated the best way now known to me of carrying out my invention; but obviously changes may be made in the general organization of the machine and in the details of construction without departing from the novel features of my invention.

I claim as my invention—

1. A combined seed-planting and harrowing machine comprising seed-feeding devices, and obliquely-inclined teeth constructed, shaped, and arranged to lift the soil without turning it and provided with means for scattering and delivering the seed beneath the uplifted soil and constructed to drop the loosened pulverized soil upon the seed thus deposited, substantially as described.

2. A combined seed-planting and harrowing machine comprising a main frame, a seed-box supported on standards and held above the main frame, seed-feeding devices, teeth constructed, shaped, and arranged to lift the soil without turning it and to drop the loosened pulverized soil upon the seed thus deposited, means for scattering and delivering the seed beneath the upturned soil, and tubes or conduits leading from the seed-feeding devices to the lower ends of the teeth, substantially as described.

3. A combined seed-planting and harrowing machine comprising a main frame, a seed-box supported on standards and held at an elevation above the frame, force-feed devices in the seed-box for delivering seed therefrom, obliquely-inclined harrow-teeth constructed, shaped, and arranged to lift, loosen, and pulverize the soil without turning it and provided with means for scattering the seed beneath the uplifted soil, and pipes, tubes, or conduits leading from the seed-feeding devices of the seed-box to the harrow-teeth.

4. A seed-feeding device comprising a longitudinally-divided shaft, a series of pairs of serrated collars mounted thereon, one collar of each pair being secured to a longitudinally-adjustable member of the shaft and the other collar to a non-adjustable member thereof, and a slotted feed-tube within which the shaft and its collars are arranged.

5. The herein-described seed-feeding devices, comprising a hopper provided with a longitudinal opening at the bottom, a feed-tube having a series of pairs of openings and secured to the open bottom of the hopper, a longitudinally-divided shaft within the tube, a series of pairs of feed-collars carried thereby, and means for adjusting one member of the shaft to adjust the feed-collars relatively to each other.

6. The herein-described seed-feeding devices, comprising a longitudinally-divided shaft carrying a series of pairs of feed-collars, one collar of each pair being secured to a stationary or non-adjustable member of the shaft and the other collar of each pair being secured to a longitudinally-adjustable member thereof, a sleeve secured to the non-adjustable member of the shaft, a sleeve adapted to turn about said first-mentioned sleeve, and a pin or bolt extending through a longitudinal slot in the first sleeve and through an inclined slot in the second sleeve, whereby one member of the shaft may be adjusted longitudinally relatively to the other to vary the distance between the feed-collars.

7. The herein-described seed-planting devices, comprising a longitudinally-divided shaft carrying a series of pairs of feed-collars, a sleeve secured to one member of the shaft, a sleeve surrounding the first-mentioned sleeve, a pin or bolt extending through slots in both sleeves, a pointer secured to one member of the shaft, and a dial carried by the other member, whereby the quantity of grain sown may be determined.

8. A cultivator-tooth having an inwardly-inclined hollow shank and a wide flat substantially-horizontal point or shovel $m^4$ and provided with means for distributing the seed delivered through the hollow shank of the tooth.

9. A cultivator-tooth having a hollow skeleton shank tubular at top and bottom, cut away between its ends, having a wide flat point or shovel, and provided with a sheet-metal tube within the shank.

10. A cultivator comprising a main frame, teeth carried thereby, carrying-wheels for supporting the frame, hinged arms to which the wheels are connected, pivoted lifting-arms adapted to rest on the ground, carried by the frame for raising the frame and teeth, means for operating the lifting-arms, and means for holding the frame and wheels in their elevated positions.

11. A cultivator comprising a frame, teeth carried thereby, carrying-wheels, hinged arms to which the wheels are connected, vertical toothed bars connected with the wheels, devices for holding the toothed bars in the desired vertical position, lifting-arms for raising the frame with the teeth, and means for operating the lifting-arms.

12. The combination, substantially as hereinbefore set forth, of the main frame, a series of teeth carried thereby, carrying-wheels, hinged arms to which the wheels are connected, vertical rack-bars connected to the wheels, means for holding the rack-bars in the desired vertical position, a shaft operated by the driver, and means operatively connected with the shaft for connecting and disconnecting the vertical rack-bars from the devices which hold them in the position to which they are set.

13. The combination, substantially as hereinbefore set forth, of a transverse shaft, radial outwardly-inclined lifting-arms carried at opposite ends thereof, a ratchet-wheel connected to the shaft, and a foot-lever carrying a pawl engaging said ratchet-wheel.

14. The combination of a feed-shaft, a sprocket-wheel carried thereby, the carrying-wheels, the pivoted arms to which they are connected, a sprocket-wheel the axis of which is in line with the pivots of the wheel-carrying arms, and driving connections between said sprocket-wheel, the carrying-wheels, and the sprocket-wheel of the seed-feed shaft.

In testimony whereof I have hereunto subscribed my name.

SILAS G. RANDALL.

Witnesses:
F. H. WILLIAMS,
EUGENE CLINTON.